June 15, 1954

C. L. BAKER ET AL 2,681,290

WATER-RESISTANT SILICATE ADHESIVES FOR THE
MACHINE FABRICATION OF PAPER BOARD

Filed Jan. 3, 1952

INVENTORS
Chester L. Baker
BY Robert H. Sams

Henry C. Parker
ATTORNEY

INVENTORS
Chester L. Baker
Robert H. Sams
BY Henry C. Parker
ATTORNEY

Patented June 15, 1954

2,681,290

UNITED STATES PATENT OFFICE 2,681,290

WATER-RESISTANT SILICATE ADHESIVES FOR THE MACHINE FABRICATION OF PAPER BOARD

Chester L. Baker, Narberth, and Robert H. Sams, Darby, Pa., assignors to Philadelphia Quartz Company, Philadelphia, Pa., a corporation of Pennsylvania Application January 3, 1952, Serial No. 264,778

20 Claims. (Cl. 106—79)

This invention relates to water-resistant silicate adhesives for the machine fabrication of paper board; and it comprises a silicate-vegetable protein adhesive suitable for use in the high-speed machine production of corrugated paper board for example; said adhesive comprising a freshly made mixture of a vegetable protein material, selected from a class consisting of vegetable proteins and vegetable protein-carbohydrate flours containing at least about 10 per cent protein, in quantity sufficient to produce a vegetable protein content in the mixture within the range of from about 2 to 10 per cent by weight, with a commercial aqueous sodium silicate solution in amount varying correspondingly from about 55 to 2 per cent by weight and with sufficient added water present during the mixing to produce a viscosity at operating temperature of from about 0.7 to 6 poises, the ratio of the total alkali present, expressed as $Na_2O$ to the $SiO_2$ of the silicate solution being within the range of from about 1:2 to 1:4; said adhesive also advantageously containing not more than about 20 per cent of ungelatinized starch at least part of which may be derived from the protein-carbohydrate flour used in the mixture; this starch being advantageously added as such in the case of adhesives made from vegetable protein materials containing less than about 15 per cent by weight of starch; and said adhesive being substantially free from any extraneous alkali in addition to that present in said silicate solution, having the characteristic property of increasing in viscosity upon heating even without substantial evaporation of water and having a working life of from about 1 hour to approximately a week. The invention also includes a process for making the described adhesive; all as more fully hereinafter set forth and as claimed.

This is a continuation-in-part of our applications, Serial No. 474,486, filed on February 2, 1943 (now abandoned), and Serial No. 641,426, filed January 16, 1946, now abandoned. In these prior applications we described and claimed silicate-vegetable protein adhesives, the protein content being derived either from vegetable proteins or from protein-carbohydrate flours. Most of the latter, of course, contain starch and hence the adhesives prepared from protein-carbohydrate flours contain starch inherently. In the present application we describe adhesives which may contain starch added as such since our tests show that in the case of adhesives made with high-protein flours or with vegetable protein itself, an addition of starch is usually advantageous. We have determined more accurately the critical limits for viscosities and concentrations of the various components of our adhesives which are necessary to produce maximum strengths and water resistance of the adhesive bonds.

Within the past few years an important demand has arisen for water-resistant laminated paper board, especially for use in the export shipment of various materials. Silicate adhesives have long been used in the machine manufacture of laminated paper board owing to their low cost and to the strong, vermin-proof bond produced. But the conventional silicate adhesives are not sufficiently water resistant to meet some of the more rigid specifications which have been recently drawn for paper board used in export shipment. One of these specifications, for example, requires that a test piece of combined board 0.1 inch thick, having dimensions of 10" by 6", shall absorb no more than 50 per cent by weight of water upon immersion at a temperature of 80° F. for a period of two hours, the Mullen test after immersion being not less than 200 when measured 2 inches from the edge. This specification further requires that any separation of the plies caused by an immersion of 1 hour must not exceed 2 inches at any point. The ordinary silicate adhesives are not capable of producing combined paper board with bonds sufficiently water resistant to meet such specifications.

Many attempts have been made in the past to improve the water resistance of the bonds produced by silicate adhesives and to prevent desizing and staining caused by the alkali present in these adhesives. One method which has met with some success in reducing desizing comprises impregnating the paper plies with a metal salt which is capable of reacting with the silicate and thereby retarding penetration of the alkali into the paper. But when attempts have been made to add insolubilizing metal salts to the silicate solutions themselves, it has been found that the resulting adhesives are too unstable and set too quickly for practical use.

It is also true that many proposals have been made to modify vegetable protein adhesives, for example, by the addition of sodium silicate solutions in minor amounts. In these modified protein adhesives a caustic alkali, such as sodium hydroxide or lime, has been incorporated. And it has been supposed that the addition of a caustic alkali is necessary in order to produce satisfactory dispersion of the protein. It has apparently never been proposed to employ these silicate-modified vegetable protein adhesives in the machine manufacture of laminated fiber board. And such use would not be practical for the reason that none of these proposed adhesives meets the very rigid specifications required of adhesives which are to be used in high-speed pasting machines.

The requirements which must be met by adhesives used in the modern, high-speed pasting machines, in the making of combined and corrugated paper board, are very strict. For satisfactory performance these adhesives must not penetrate the paper plies substantially since this results in additional expense for adhesive, increased brittleness of the board and usually inferior bonds. But at the same time these adhesives must possess a relatively low viscosity in order to enable them to be spread quickly. Moreover the wetting power of the adhesives must be high, especially when used in combining heavily sized plies. It is very important that these adhesives possess thixotropic characteristics which serve to hold them at the point to which they are applied. But the most important characteristic required in such adhesives is a short time of set to enable satisfactory rate of production of the paper board in the continuous type of pasting machine. Such machines are frequently run at speeds of 200 feet or over per minute. An important limit to their speed is the time of set of the adhesive used. Any adhesive whose use in such a machine could be considered practical must therefore set sufficiently to unite the plies within a time interval which is measured in fractions of a minute. The difficulties of obtaining all these characteristics in one adhesive are evident when it is realized that the requirement of low penetrating power is generally at variance with the requirements of high wetting power and low viscosity, for example.

In the case of straight silicate of soda adhesives which are used in high-speed pasting machines, a quick set is obtained by the evaporation of a small amount of water. These adhesives have the characteristic property of increasing enormously in viscosity upon the evaporation of only a few per cent of water and this produces what is known in the art as the "grab" required to adhere the plies as they are passed through a fabricating machine. The silicate adhesives which have these particular properties extend only over a narrow range of concentrations and silicate ratios.

In the case of silicate-protein adhesives it is impossible to produce a comparable viscosity increase due solely to the evaporation of water for the reason that the protein present substantially retards the evaporation of water. But we have discovered that, if sufficient protein is present and if the composition of these adhesives is controlled within certain narrow limits, a very similar effect is produced but in a different manner, namely by glutinization of the protein present. This effect is produced by heat but usually from about 50 to 200 per cent more total heat is required than in the case of silicate adhesives. This increase of heat can be obtained conveniently in the conventional fabricating machine by increasing the temperature to which the plies are preheated and/or by increasing the operating temperature of the hot plates and/or the pressure rolls, which are pressed against the combined plies, and/or by increasing the time of contact of the combined stock with these elements, for example, by increasing the linear length of the heating surfaces. When our adhesives are used these surfaces should be heated to temperatures ranging from about 180° to 430° F. and the corresponding time of contact should be from about 40 to 0.1 second.

It is evident from the above that our new adhesives operate upon an entirely different principle from the straight silicate adhesives. Even a different chemical reaction is involved. But the same quick "grab" is produced upon the application of heat and this is what enables these adhesives to be used in high-speed machines.

The silicate-protein adhesives of the prior art, to which extraneous alkali has been added, are totally unsuited for use in high-speed pasting machines. We have found that upon heating or standing these adhesives actually decrease in viscosity rather than increasing, this effect being due, presumably, to progressive degradation of the protein by the caustic alkali. It is believed evident that any adhesive which decreases in viscosity upon heating could not be employed for our purposes. But we have discovered that if a minimum of about 2.0 per cent of vegetable protein is present and if the total alkali present, expressed in terms of $Na_2O$, is such that the over-all ratio of $Na_2O$ to $SiO_2$ does not exceed about 1:2, a substantial rise in viscosity is produced upon heating or standing. We have further discovered that this increase in viscosity can be used as a convenient critical test to determine whether or not a silicate-protein adhesive is suitable for use in high-speed pasting machines.

It would normally have been expected that any starch present in these adhesives would be detrimental in reducing the water resistance of the adhesive bonds. We have found that this detrimental effect actually does take place if too much starch is present but that, if the content of starch is restricted to a maximum not exceeding about 20 per cent by weight on the dry basis, with a preferred content ranging from about 3 to 15 per cent, the starch produces more advantages than disadvantages. The most important advantage produced by starch is an increase in the dry bond strength. And in many industrial applications dry bond strength is more important than maximum water resistance, i. e. wet bond strength can be sacrificed to some extent for increased dry bond strength. Ungelatinized starch is employed and this, of course, becomes gelatinized during the combining step when heat is applied. The viscosity of the adhesive is increased by gelatinization of the starch, the effect produced being much like that produced by gelatinization of the protein. Hence the starch does not increase the time of set of the adhesive which, of course, is very important. The ungelatinized starch in the adhesive increases the viscosity to some extent i. e. it adds "body" to the adhesive, which means that the required working viscosity can be obtained with more water present. In most of our adhesives the working life is increased by the addition of starch which, of course, is of extreme importance. We have actually formulated starch containing adhesives having working lives of up to about a week. The starch stabilizes the viscosity and greatly delays the eventual gelation of the adhesive. Possibly this is due to the fact that the starch tends to bind the water present thereby delaying the slow gelatinization of the vegetable protein, which eventually raises the viscosity to the point at which the adhesive can no longer be employed. The starch also makes the adhesive more tolerant, that is, the adhesives containing starch can be used under a wider range of operating conditions; their viscosities, concentrations etc. are less critical. For example, they can be employed on different machines and for uniting different types of paper with less adjustment of water content, viscosity etc. It is also true that the presence of starch in the adhesive makes the components of the adhesive easier to blend in the compounding thereof.

When carbohydrate-vegetable protein flours containing more than about 15 to 20% by weight of starch are used in compounding our adhesives it is usually not necessary to add additional starch. But in the case of soya bean flours, peanut flour, the meals of various legumes and other high-protein vegetable flours, the actual starch content is usually less than 15 per cent by weight although the "carbohydrate" content may exceed 50 per cent, and, of course, in the various preparations of vegetable proteins sold on the market the starch content is negligible. In adhesives prepared from these materials the addition of starch in amounts ranging from about 1 to 15 per cent by weight is most advantageous, as pointed out above. While vegetable protein constitutes the critical thickening agent as well as the water-proofing agent in our adhesives, it is often good practice to reduce the content of vegetable protein to the limits at which the wet bond strengths produced are still acceptable while adding starch to increase the initial viscosities to values within the operating range. The result is an adhesive with a longer working life, greater compatibility etc. as pointed out above. In effect the addition of starch furnishes initial viscosity while not increasing the thickening rate.

We have also found it possible to add clay to our adhesives without detrimental effect provided that the content of clay does not exceed about 12 per cent by weight on the dry basis. The clay increases the thixotropic properties of the adhesive which results in less spreading and absorption by the paper. In other words the clay makes the adhesive stay at the point where it is applied, always an important factor in the manufacture of corrugated paper board. While clay tends to reduce the wet bond strength it usually increases the dry bond strength. Clay also adds "body" to the adhesive and hence permits more water to be present for a given working viscosity. But it does not increase the working life of the adhesives as does the addition of starch. Thus clay cannot be considered as being the equivalent of starch although, as stated, it is an optional addition and has some advantages.

In making viscosity tests to determine the suitability of a silicate-protein adhesive for use in pasting machines we have found it most convenient to employ the so-called Viscograph, the principle of which is described in the ASTM Bulletin of January 1943, sold by Brabender Corp. This machine automatically records the viscosity changes of a liquid while it is held at a constant temperature or when the temperature is increased at a constant rate. In our tests we have standardized upon a procedure in which the temperature of the adhesive tested is raised from 25° C. to 95° C. at an average rate of about 1.43° C. per minute. During the heating the exposed surface of the adhesive is covered with a layer of mineral oil which substantially prevents loss of water by evaporation. This procedure gives the most reliable and characteristic results. The time and viscosity values are transcribed from the automatic recording and plotted as degrees C. and poises according to calibration charts which may be readily prepared. Our tests have shown that silicate-vegetable protein adhesives which increase in viscosity during this Viscograph test, reaching a minimum viscosity of at least about 7 poises or which increase in viscosity upon merely standing for a period of about 12 hours at a temperature of 80° F. are suitable for use in high-speed pasting machines. These adhesives can be produced over only rather narrow ranges of concentrations etc. which can be summarized as follows:

1. The vegetable protein present must be within the range of about 2 to 10 per cent by weight.
2. The silicate concentrations must vary correspondingly from about 55 to 2 per cent, expressed in terms of commercial silicate solutions. There is a lower range of silicate concentrations extending from about 30 to 2 per cent by weight which have been found useful for many purposes. These adhesives produce maximum wet strength bonds. However there is a higher range, extending from about 40 to 55 per cent which has been found best for commercial production of corrugated paper board, providing adequate working life and better operating performance under a variety of machine and paper conditions and wet bond strengths acceptable for both single-face and double backer bonds. Compositions between these two ranges, i. e. those containing from about 30 to 40 per cent of silicate have shorter working lives and are therefore less advantageous.
3. The ratio of the total caustic alkali present, expressed in terms of $Na_2O$, to the $SiO_2$ present must be within the range of about 1:2 to 1:4. Best results are produced over the narrower range of 1:2.9 to 1:4.
4. Sufficient water must be present to produce an initial viscosity of from about 0.5 to 6 poises at operating temperatures.
5. The viscosity must rise upon heating even without substantial evaporation of water. In the described Viscograph test the viscosity should rise to a value of at least about 7 poises.
6. For the most tolerant adhesives of maximum working life starch should be present in amount ranging from about 3 to 20 per cent by weight. But this starch may be derived from the vegetable protein flour used as a source of the protein content of the adhesives. In the case of the high-protein flours, however, from about 1 to 15 per cent of starch should be added for best results.

In addition we have found that in general the more siliceous the silicate present in the adhesive, the smaller the amount required and the lower the protein content required to produce a rising Viscograph curve. Moreover it is usually possible to employ higher proportions of the silicate when the high ratio silicates are employed. For these reasons we prefer to employ silicates having a ratio of $Na_2O$ to $SiO_2$ ranging from about 1:2.9 to 1:4.

The protein in our adhesives has several important functions. It reduces the causticity of the silicate and reduces migration of the alkali into the plies by combining with the $Na_2O$ of the silicate. More important, the protein increases the thixotropic properties of the silicate and decreases its penetrating power. In addition the protein speeds up the setting of the adhesive by gelling or glutinizing rapidly upon the application of heat. But the most important and surprising effect produced by the protein addition is the production of adhesive bonds which are many times as water resistant as bonds produced with either the protein alone or the silicate alone.

Our adhesives are actually less caustic than unmodified silicate adhesives, which is a decided advantage. We believe that the active protein fraction of our adhesive can be considered as consisting of chiefly "glycinin" which, on hydrolysis, passes through an intermediate stage of peptones, proteoses, etc., and finally yields principally glycine ($NH_2CH_2COON$) and glutamic acid ($COOHCH_2CH_2CHNH_2COOH$). In dilute alkaline solutions, these groups (which originally existed as glycinin in long-chain units joined by CONH bonds) form the sodium salt of glycine and the mono-sodium salt of glutamic acid, with the sodium replacing a hydrogen on the carboxyl group nearest the $NH_2$ group of the latter acid. This bond probably accounts for the decreased alkalinity of our adhesives. The removal of the alkali in this way probably results in the precipitation of hydrous silica or hydrous silica gel which is highly resistant to dissolution in water. The hydrous silica or charged colloidal silica which is separated is probably attracted to points of opposite charge on the protein surfaces and serves to bind the convoluted protein into a solid mass. This effect contributes materially to the water resistance and mechanical strentgh characteristic of bonds made with our new silicate-protein adhesives. But regardless of whether or not this is the correct explanation of the phenomena observed, the fact remains that adhesives of the type described have all the special characteristics required to be used in the machine fabrication of laminated paper boards as well as producing bonds which are many times as water resistant as bonds produced by other silicate adhesives having these characteristics. In addition the bonds so produced are sufficiently free from alkali, or at least the penetration of the alkali therefrom is reduced to such an extent, that the coating of the plies with insolubilizing metal salts is no longer required in the production of water resistant board.

Our new adhesives increase in viscosity with time, eventually becoming so viscous as to be unworkable. In general their working life can be increased by holding the temperature as low as possible and by other means, such as by keeping the concentration low or by increasing their starch content, so that if necessary one can formulate our adhesives so that they can be preserved for several days. Some of our adhesives which contain no added starch have working lives of only from about 15 minutes to from about 8 to 12 hours. These adhesives are commercially useful in spite of their short working lives. However our adhesives which contain from about 3 to 15 per cent of starch have working lives of up to about a week when held at ordinary room temperatures or below. In commercial practice the formulation is adjusted to give the working life required for the particular commercial operation. As indicated above the increase of viscosity of our adhesives upon heating or standing is closely related to their tendency to set quickly upon the application of heat, which tendency enables their use in high speed pasting machines.

Our adhesives can be made from all vegetable proteins and oil seed flours in general can be used as the source of protein. Even seed grain flours, such as wheat and rye flours can be utilized although these furnish more starch than is usually desired in the adhesives. The leguminous flours, such as soy bean, peanut meal, lima bean meal, and the similar nut types, such as walnut, cotton seed meals, castor bean flour and linseed meal all contain large percentages of vegetable protein and most of these contain less starch than is desired in our adhesives. Most of the "carbohydrate" content of these flours is made up of sugars rather than starches. As mentioned previously we have found it advantageous to add starch to these types of flours. While the oil present in some of these flours does no particular harm it apparently has no beneficial effect and we therefore prefer to employ commercial flours which are produced by grinding the residue left after removal of the oil.

It is advantageous but not necessary to include in our adhesives a small amount of a preservative. We prefer for this purpose one of the liquid distillation products of tar obtained from organic sources (wood, peat or coal), such as pine oil, pine tar oil, rosin oil and tar acid oil. It is also possible to use sodium benzoate, borax, formaldehyde, or any other preservative for protein materials. The higher the quantity of protein present and the longer the adhesive is to stand before use the more desirable it becomes to employ a preservative.

In the accompanying drawing several graphs are given showing the relationships between the compositions of our adhesives and their properties. In this showing.

Figure 1:
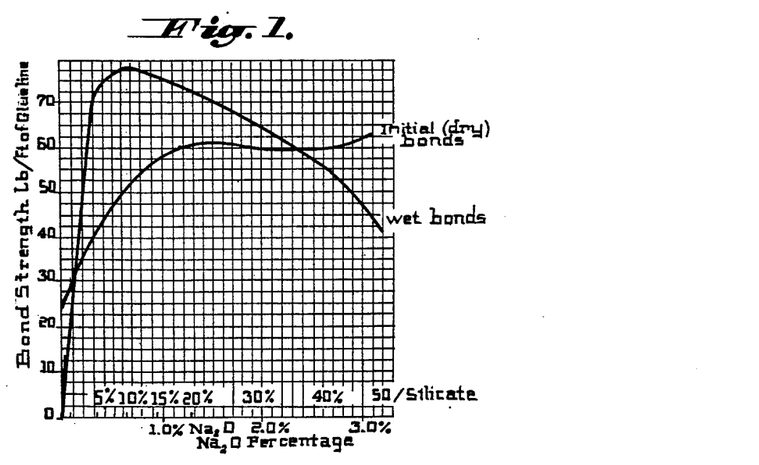
Fig. 1 is a chart with two curves showing the initial dry and wet strengths of adhesive bonds produced with our adhesives to which no starch was added as a function of the quantity of silicate present.

The curves in Fig. 1 were made with a series of adhesives containing 15 per cent peanut flour (59 per cent vegetable protein) and varying percentages of "S" silicate solution having a ratio of $Na_2O$ to $CiO_2$ of 1:3.9. The silicate concentrations are indicated above the base line of the figure and vary from 0 to 50%, while the figures below the base line relate to the corresponding percentages of $Na_2O$ in the silicate solution. The data along the left hand axis of the plot correspond to the strength of the initial bonds. These values should be reduced by one-tenth for wet bond strengths, that is, the scale reading from 0 to 70 pounds per foot of glue line for the initial bonds should read from 0 to 7 pounds for wet bond strengths.

In making the curves of Fig. 1 the adhesives were aged for 30 minutes at 80° F. and then applied to the tips of a corrugated liner with a spread of 14 to 18 pounds per thousand square feet of glue line, this coated liner being combined with a facing sheet using a setting time of 10 seconds at 330° F. In measuring wet bond strengths samples of the combined board were suspended with the flutes vertical in tap water at room temperature for 24 hours before being tested for strength.

In view of the fact that the corresponding wet bond strengths of bonds made with silicate solutions alone or with protein flours alone are zero, it is indeed surprising to find that our adhesives produce bonds which are as water resistant as indicated in Fig. 1. These bonds are as strong after soaking as the starch-urea-formaldehyde V-type bonds used during the war. The wet strength is determined by the strength of the paper itself when desizing does not have a substantial effect.

It will be noted from the curves of Fig. 1 that the wet bond strength of an adhesive containing 15 percent of peanut flour starts at zero but is increased enormously by the addition of even a fraction of one percent of $Na_2O$ derived from a 1:3.9 ratio silicate solution and that the wet bond strengths remain high even when the silicate forms up to 50 per cent of the total adhesive. The initial bond strengths increase more slowly upon the addition of silicate but the curve representing initial bond strengths shows no tendency to fall as the percentage of silicate is increased.

Figure 2:
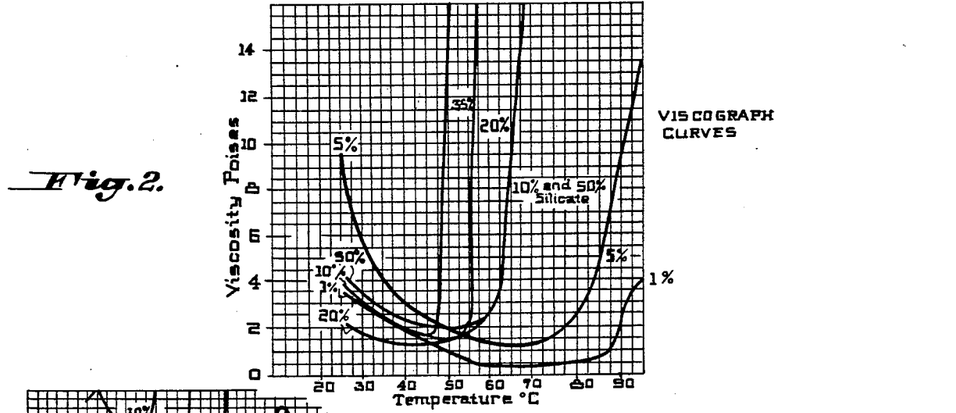
Fig. 2 is a chart showing several Viscograph curves plotted from Viscograph data obtained with adhesive containing a fixed percentage of vegetable protein without added starch and varying percentages of a silicate solution.

The Viscograph curves of Fig. 2 were made under standard conditions with the temperature of the adhesive rising at a constant average rate of 1.43° C. per minute. All of the adhesives tested in this plot, with the exception of the curve representing 50 per cent silicate, contained 14.55 percent of soya bean four (53 percent vegetable protein), 0.3 percent pine oil and 0.15 percent of $Fe_2O_3$. In addition the adhesives contained various percentages of "S" silicate solution (ratio $1Na_2O:3.9$ $SiO_2$), ranging from 1 to 35 percent, as indicated on the curves. The curve representing 50 per cent silicate, which, at temperatures above about 55° C., substantially coincides with the curve representing 10 percent silicate, was prepared by mixing 15.6 percent "Prosein" soy flour (53% protein) with 0.3% pine oil, 0.15% $Fe_2O_3$, 33.6% water and 50% "S" silicate. The flour used in producing the other curves in the figure was not available when this curve was made but the "Prosein" soy flour was comparable thereto.

The curves on this plot provide some indication as to the life of the adhesives plotted. That is, the adhesives whose curves start to rise at relatively low temperatures have working lives which are shorter than those whose curves show "knees" at higher temperatures. The plot shows that the working life of the adhesives represented goes through a minimum at about 35% silicate, the life increasing with silicate concentrations both above and below this value. This emphasizes the fact that adhesives containing from about 2 to 30% silicate and those containing from about 40 to 55% silicate are more valuable industrially than those containing a silicate concentration of from about 30 to 40%. The cause for the minimum working life in the latter concentration range is unknown.

Figure 3:
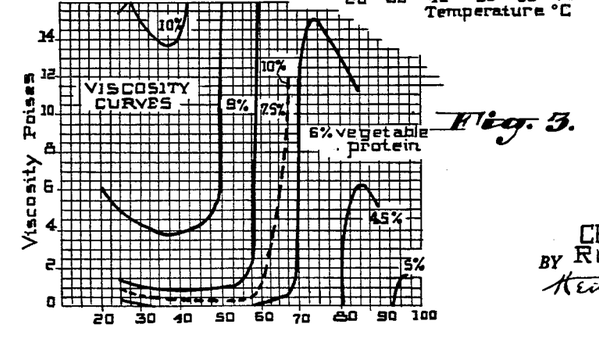
Fig. 3 is a chart showing similar curves obtained with adhesives containing a fixed percentage of silicate solution and varying percentages of vegetable protein, one curve being that of a starch-containing adhesive.

The Viscograph curves indicated by full lines in Fig. 3 were made in the same manner but the adhesives tested all contained 12 percent of "N" silicate solution (ratio $1Na_2O:3.2SiO_2$). The various percentages of vegetable protein in these adhesives is indicated on the curves, this protein being derived from a soya bean flour containing about 53 percent of protein. This set of curves shows that the vegetable protein content of our adhesives may be varied from about 3.5 to at least 10 per cent by weight.

The dotted line in the figure was made an adhesive containing

10% soy flour (53% protein)
5% powdered cornstarch
45% "N" silicate solution
40% water This curve shows that starch-containing adhesives produce the same type of Viscograph curve as adhesives containing no starch. This adhesive contained more water than the 10% silicate adhesive represented by the curve in full lines in the upper left of the figure, this addtiional water accounting for the lower initial viscosity. The fact that the dotted curve has a knee at about 60° C. as compared with about 38° for the starch-free adhesive gives an indication that the former has a longer working life.

Figure 4:
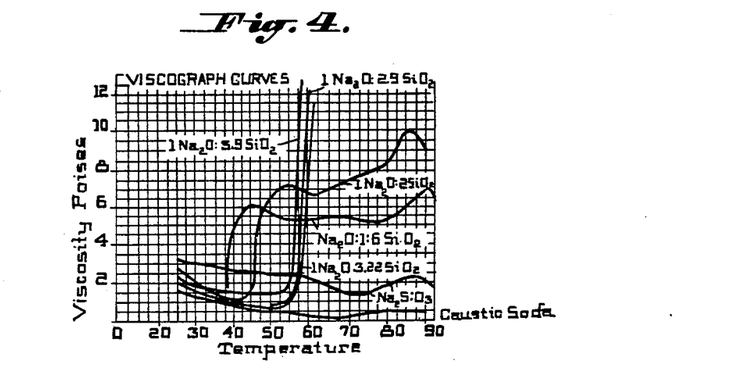
Fig. 4 is a chart having a series of Viscograph curves plotted from Viscograph data obtained with adhesives containing a fixed percentage of vegetable protein and silicates having varying ratios of $Na_2O$ to $SiO_2$, while Fig. 5 contains two curves one of which shows the increased dry strength obtained as a result of the use of starch in an adhesive while the second shows how the addition of starch increases the working life of an adhesive.

The Viscograph curves of Fig. 4 were made in the same manner using adhesives all of which contained 14.55 percent by weight of a soya bean flour (53 percent protein), 0.3 percent pine oil and 0.15 percent of $Fe_2O_3$. This product was mixed with silicate solutions having various ratios of $Na_2O$ to $SiO_2$ as indicated on the curves. In order to obtain strictly comparable results, all adhesives contained 1.07 percent of $Na_2O$, which corresponds to 12 percent by weight of "N" having a ratio of $1Na_2O:3.22$ $SiO_2$.

It will be seen that the Viscograph curve for an adhesive containing 1.07 percent caustic soda falls as the temperature is increased and this is also true of an adhesive containing a silicate having a 1:1 ratio of $Na_2O$ to $SiO_2$. This type of curve is characteristic of silicate-protein adhesives containing added caustic alkalis. The curve for the adhesive containing a silicate with a ratio of $1Na_2O:1.6SiO_2$ has a rising section which barely reaches a value of 7 poises at 90° C. We have found that adhesives having Viscograph curves of this type can be used in the machine fabrication of combined board but only at relatively slow speeds. On the other hand it is seen that the curve for the silicate having a ratio of $1Na_2O:2SiO_2$ rises well above 7 poises and our tests show that this adhesive is suitable for use in relatively high-speed machines. The adhesives containing silicates of still higher ratio are even more suitable as is evident from their Viscograph curves.

Figure 5:
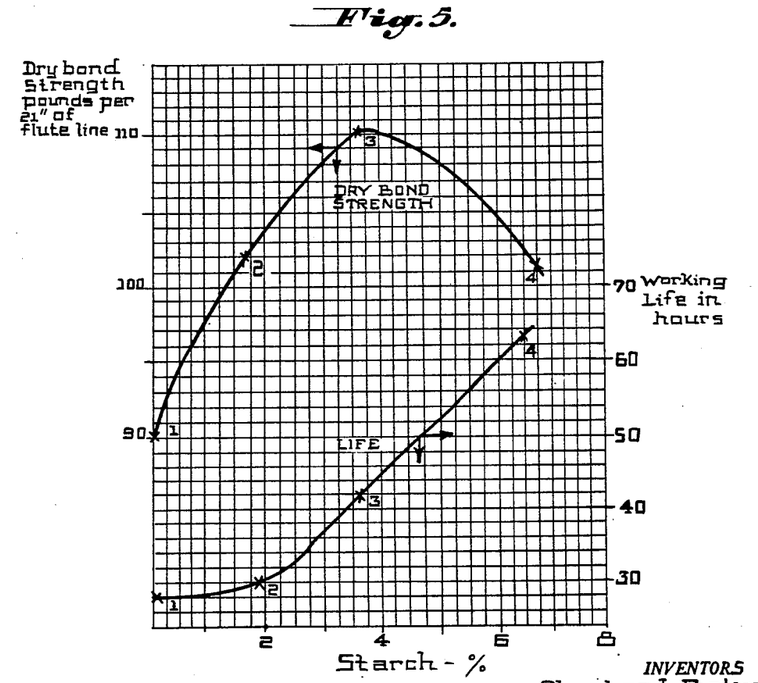

The curves in Fig. 5 were obtained using 4 adhesive compositions compounded as follows:

1

12% "Kaysoy 144" flour
43% water
45% "N" silicate

2

11.5% "Kaysoy 144"
1.9% corn starch
41.6% water
45% "N" silicate

3

11% "Kaysoy 144"
3.7% corn starch
40.3% water
45% "N" silicate

4

10% "Kaysoy 144"
6.7% corn starch
38.3% water
45% "N" silicate

The soya flour used had the following analysis:

| Average Analysis | Percent |
| --- | --- |
| Portein | 47.0–50.0 |
| Percent of Protein Water Soluble | 66.0–69.0 |
| Percent of Bulk Water Soluble | 66.0 |
| Fat | 0.5 |
| Carbohydrates | 35.0 |
| Fiber | 7.0 |
| Moisture | 7.5– 9.0 |
| Ash | 6.0 |
| Percent Total Soluble in 5% NaOH Solution | 80.0 |

It was necessary to vary the quantities of water in these adhesives and the quantities of soya flour in order to produce the same initial (working) viscosity—1.3 poises. To determine the "working life" of these adhesives viscosity measurements were taken at measured intervals on a Stormer viscometer while the adhesives were stored at 25° C. in closed vessels, the viscosity readings were plotted as a function of the time and the end of the "working life" was taken to be the point at which the viscosity began to increase rapidly, i. e. the "knee" of the curves. The appearance of a "knee" in such a curve indicates the approach or starting of gelation and the knee is always sharply marked. For mixture #1, for example, after a storage period of 24 hours, the viscosity had increased from an initial value of 1.3 poises only to a value of 1.4 poises. But after 31 hours storage the viscosity measured 15 poises, a value too high for normal operations. It should be noted that the indicated increase in working life caused by the addition of starch does not occur in all of our adhesives. Its appearance is somewhat erratic and seems to depend to some extent upon what type of protein flour is used in making the adhesives.

In determining the dry strength of the bonds produced by these adhesives, experimental bonds were produced promptly after the adhesives were compounded using a standard double-face bonding procedure. The glue "spread" was approximately 0.015″ thick and the bond was set for about 15 seconds on a surface heated to 300° F. After a curing period of 5 days at 25° C. and a relatively humidity of 50%, the bonds were tested for tensile strength using the Thwing-Albert hydraulic tensile tester. The average strengths were plotted to form the upper curve of Fig. 5. The wet strengths of bonds produced by these adhesives were also tested and were found to be about 13 lbs./21″ of flute line. This is a normal wet bond strength and represents approximately the strength of the wet fibers. In these tests the so-called fiber tear (dry) was also estimated as a per cent of the surface. The values obtained for the four adhesive compositions were 20, 50, 80 and 60%, respectively. These and other tests indicate that the addition of starch in small amounts produces no substantial decrease in wet bond strength—a finding which was highly surprising.

The following specific examples represent practical operating embodiments of our adhesive which illustrate our invention and which can be used in our laminating process.

Example 1

13.7% special defatted soybean protein, known as "Special Soybean Protein" sold by the Archer-Daniels-Midland Company of Minneapolis, Minnesota, and containing 53% protein.
0.7% pine oil.
31.4% water.
54.2% sodium silicate solution with an alkali-silicate ratio of 1:3.22, an Na2O content of 8.9%, known as "N" and sold by Philadelphia Quartz Company of Philadelphia. The initial viscosity of this product was 1.5 poises.

Example 2

26.0% wheat flour, known as Tartan brand cake and pastry flour, sold by Alfred Lowry and Bro. of Philadelphia.
0.7% pine oil.
53.3% water.
20.0% sodium silicate solution, "S"

(1Na2O:3.9SiO2)

The initial viscosity of this product was 1.3 poises. In a Viscograph test of this adhesive a viscosity of 7.14 poises was reached at 70.4° C. and at 72.1° C. the viscosity had reached 15.5 poises.

In this example the vegetable protein content of the adhesive (3% by weight) is close to the minimum required while the starch content (19.5%) is about the maximum permissible. But with this adhesive it was found that the protein present was sufficient to produce definite wet bond strength while in the absence of this protein the wet bond strength would have been zero.

Example 3

15.0% soybean flour (SF#100 sold by Central Soya Co., Inc.).
73.0% water.
12.0% "N" silicate solution (1Na2O:3.22SiO2).
The initial viscosity of this adhesive was about 1 poise.

Example 4

17.4% "Proflo" cottonseed flour produced by the Traders' Oil Mill Co., Ft. Worth, Texas, and containing about 57.5% protein.
2.0% "S" (ratio 1Na2O:3.9SiO2).
80.6% water.

The standard Viscograph data obtained was as follows:

25° C.= 0.32 poise
30.0° C.= 0.36 poise
53.4° C.= 0.50 poise
67.7° C.= 0.88 poise
75.0° C.= 1.49 poises
81.9° C.= 4.30 poises
86.5° C.=11.17 poises
89.3° C.=13.42 poises
92.2° C.=14.85 poises
95.0° C.=14.61 poises When using cottonseed flour and "S" silicate, as in this example, it is possible to employ somewhat larger proportions of the flour than would correspond to 10 percent protein by weight.

Example 5

12.0% SF#100 soybean flour.
0.2% pine oil.
40.0% "Stixso DD" sodium silicate (ratio Na2O:SiO2 as weight per cent 1:3.40, 8.3% Na2O).
6.0% Huber's Chicora #3 clay.
The viscosity of this mixture at room temperature was 0.7 poise.

Example 6

4.3% pearl cornstarch, #3011 sold by Clinton Foods, Inc., Clinton, Iowa.
36.8% water.

10.7% "Prosein" soybean flour produced by the Glidden Co., Cleveland, Ohio, which has an approximate analysis of 53.5% protein, 0.9% fat, 2.3% fiber, 31% of nitrogen-free extract, 5% water.

42.9% dissolved silicate; approximately 40° Bé. solution having a ratio of 1Na₂ to 3.22SiO₂.

5.4% of Barden's clay, a kaolin or china clay sold by the J. M. Huber Corporation, New York city.

The first three ingredients were mixed together until the mass was creamy and lump-free. The silicate was then added and finally the clay, and the whole batch mixed to a smooth paste having a viscosity of about 1.3 poises at about 37° C. The viscosity increased gradually until, about six hours after the mixture had been completed, a gelatinous condition appeared indicating the end of a satisfactory working life.

The adhesive was used with a combining machine operated at 200 to 225 feet per minute using 90 lb. liners and hard-sized kraft paper 0.025 inch thick. B-flute board produced was considered both as to formation and bond. The board was "firmer, flatter, and of better quality as it came off the knife than the board made with weather-proof starch adhesive previously used." Samples of the board were returned to the laboratory and were tested under standard conditions after conditioning three days at 25° C. and 50 per cent relative humidity. The bond strengths were determined, after 24 hours' soaking in tap water at 25° C., with a Twing-Albert electro-hydraulic tensile tester with the following results reported in terms of twelve inches of glue line:

|  | dry | wet |
|---|---|---|
| Single-face | 42 | 3.7 |
| Double-backer | 45 | 3.0 |

Although the wet strength is so nearly the same for each bond, wet samples torn by hand showed a great difference in percentage area over which fiber was distributed:

Per cent
Single-face _____________________ 100 to 95
Double-backer _________________ 5

This hand tear which is usually employed as a control test in the plant is not a dependable criterion of relative bond quality. There was no wet ply separation shown by the standard test. In general curing beyond an hour is not required to develop good wet strength bonds with our adhesive.

*Example 7*

In a pilot plant test for combining A-flute board, a series of adhesives was prepared to show the relative characteristics of varied formulae. These were all based on a composition having 10.5% Prosein, 51.5% "Stixso DD" (containing 8.3% Na₂O and 28.2% SiO₂) and 37% water. In sub-mixture A, 4 parts of Huber's Suprex clay were added to 100 parts of the base mixture. In B, 12 parts of the same clay were added. In C, 4 parts of Number 3011 pearl cornstarch were added to 100 parts of the base mixture. In D, 12 parts of the same starch were added. E was a more concentrated mixture than the base. It contained 14% Prosein, 45% of Stixso DD, and 41% of water.

The mixtures were blended with an Eppenbach homogenizer and the powdered ingredients were thoroughly dispersed in water before the silicate was added. The adhesives were used to combine hard-sized kraft paper liners, first on a continuous corrugating unit to form a single-face bond and then the double-backer bond was added by hand. The corrugating, pre-heating and pressure rolls as well as hot plates were heated by steam at 120 lbs. pressure to a temperature of about 300° F. The single-facing step was carried out at about 48 F. P. M. This is a slow speed for commercial operation but it must be remembered that in this pilot plant machine, the applicator rolls were of a small diameter i. e. about 8 inches. The double-backer glue line was set under a pressure of 40 lbs. for 15 seconds.

After the board specimens had been conditioned for three days under the standard condition of 25° C. and 50% R.H, they were tested for wet and dry bond strength as in Example 6. The wet strength test was made after 24 hours' immersion in tap water.

| Adhesive | Single-face | | Double-backer | |
|---|---|---|---|---|
|  | dry | wet | dry | wet |
| Base | 69 | 4.1 | 62 | 1.0 |
| A | 72 | 4.2 | 63 | 1.3 |
| B | 73 | 3.9 | 65 | 1.0 |
| C | 72 | 4.9 | 67 | 2.1 |
| D | 72 | 4.7 | 63 | 1.3 |
| E | 72 | 7.0 | 69 | 4.0 |

Although none of the adhesives permitted voluntary ply separations of the bond as determined by the standard soak test, only the double-backer bonds of series "E" actually tore fiber when separated after 24 hours of soaking in tap water.

*Example 8*

Another series of examples shows the comparative effects of clay and cornstarch and also compares the characteristics of a formulation prepared with cornstarch to one with wheat starch. There appears to be little difference in the effect of the starch whether it is obtained from corn or wheat but there are differences in the viscosity characteristics of the systems. The following adhesives were used:

1. 10% Prosein
   45% N silicate solution
   45% water
2. 10% Prosein
   5% Barden clay
   45% N silicate solution
   40% water
3. 10% Prosein
   5% Amaizo PF powdered cornstarch
   45% N silicate solution
   40% water
4. 8.7% Prosein
   6.4% Ceresota Enriched Wheat Flour
   45% N silicate solution
   39.9% water (This mixture has the same protein and starch content as mixture number 3.)

5. 20% Ceresota flour
   35% water
   45% N silicate

It will be noted that all of the mixtures contain 45% N silicate solution and that mixture Number 1 might be considered the basic formula. The Ceresota Enriched Flour is an edible wheat flour from the Standard Milling Company, of the class containing about 11% protein and 75% starch. Amaizo PF powdered cornstarch is a product of the American Maize Products Company, Chicago, Ill., of the edible class averaging 87% starch and 12% water.

These adhesives were used in the standard laboratory gluing procedure for forming double-backer bonds with a standard controlled spread, bonding and pre-heating techniques. Sized kraft liners were used with previously prepared A-flute single-face. Adhesives were used after a half hour of aging and were set for 15 seconds on a hot-plate at 300° F. After conditioning for six to seven days at 25° C. and 50% RH, the specimens were trimmed and tested both in the dry condition and after 24 hours' immersion in tap water. The bond testing attachment of the Thwing-Albert electro-hydraulic testing apparatus was used and the per cent fiber tear was estimated as the per cent of flute line length.

| Mix | Tensile Bond Strength, Lbs/12" of Flute line | | |
|---|---|---|---|
| | Dry | Wet | Fiber tear, percent |
| #1 | 66 | 2.2 | 2 |
| #2 | 62 | 0.9 | 0 |
| #3 | 65 | 2.1 | 2 |
| #4 | 66 | 1.5 | 1 |
| #5 | 61 | 0.2 | 0 |

The viscosity of each mixture was compared until gelation made the adhesive unfit to use. Viscosity was determined in terms of Stormer seconds using an added weight of 100 grams.

| Mix | Viscosity in Stormer (+100 gm.) Seconds at Ages of— | | | | |
|---|---|---|---|---|---|
| | ½ hour | 4 hour | 8 hour | 1 day | 2 day |
| #1 | 7.7 | 7.9 | 7.9 | 8.3 | 11.2 |
| #2 | 8.5 | 8.9 | 8.8 | 9.8 | 10.8 |
| #3 | 9.5 | 9.6 | 9.3 | 9.3 | 9.7 |
| #4 | 10.4 | 11.2 | 11.7 | 12.1 | 13.7 |
| #5 | 9.8 | 11.2 | 12.7 | 13.7 | 15.0 |

The viscosity data may be converted into approximate poise values by the equation Y poises=0.087×Stormer seconds (+100 grams).

The results obtained with mixes #3 and #4 indicate that it is possible to add starch to our adhesives in the form of a high-starch flour, such as wheat flour, instead of adding starch as such. Mix #5 contains only 2.2% vegetable protein and about 15% starch. This mix, while producing inferior wet strengths as compared to the mixtures containing more protein, is still superior to mixes prepared from protein alone, starch alone, silicate alone or starch and silicate since these would produce wet bonds of zero strength.

*Example 9*

In another series of experiments the comparative properties of mixtures with and without starch or clay were tested. It was found that a mixture of 14% Prosein, 45% Stixso DD silicate solution and 41% water thickens to twice its initial viscosity of 2.3 poises in ten hours at 25° C., where as a mixture of 10.5% Prosein, 45% Stixso DD and the rest water does not thicken to twice its initial viscosity of one poise for more than two days.

It was found that the initial viscosity of the latter mix could be increased close to 2.3 poises by the addition of 3.5% of either starch or clay without substantially shortening the period in which the initial viscosity was doubled.

In a similar test with 10% Kaysoy 144 flour, sold by Archer-Daniel-Midland Co., mixed with 50% N silicate solution and 40% water, the paste thickened from an initial viscosity of 1.0 poise to 6.1 poises in four days at 25° C. When 5% of cornstarch was substituted for 5% of the water in this formula, the viscosity of the mixture increased from an initial 1.7 poises to only 3.0 poises in four days. Thus not only was a higher initial viscosity achieved but the spontaneous gelation of the mass was retarded.

A specific instance of the advantage of starch over clay may be shown by an adhesive mixture of 10% Kaysoy flour, 5% cornstarch, 50% Stixso DD silicate solution, 35% water, which gave dry bond tests of 41 lbs. and wet bond tests of 1.8 lbs. per foot of corrugated glue-line, while a mixture of 10% Kaysoy with 5% of kaolin clay instead of the cornstarch, 50% of Stixso DD and 38% of water gave corresponding bond strengths of 42 lbs. and 0.9 when tested under identical conditions. The starch additive thus produced 100% higher wet bond strength than did the clay additive.

*Example 10*

A mixture of 10% Prosein-5% starch-35% water-50% "N" silicate was prepared and stored at 73° F. Its viscosity was not measured, but it was still just right for corrugating application after 8 days and was used then to bond a set of B-fluted board specimens. The laboratory bonds were tested later for seasoned dry and wet tensile strength with the results of 42 lb. dry bond strength and 0.2 lb. wet strength per 12" of fluteline. This wet strength would put the aged mixture in the water resistant class of adhesives above an ordinary silicate.

*Example 11*

Three additional adhesives, which were tested in practical operation on a commercial corrugating machine had the following compositions:

| | Soybean flour, percent | Water, percent | Pine Oil, percent | Silicate | Viscosity poises |
|---|---|---|---|---|---|
| #1 | 14.7 | 73.3 | 0.5 | 12.0% "S" | 2 |
| #2 | 14.5 | 54.5 | 0.5 | 30.0% "S" | 2 |
| #3 | 14.5 | 54.5 | 0.5 | 30.0% 41° "N" | 1.4 |

The above adhesives can be made up by first mixing the protein material thoroughly with sufficient water to wet the same before the addition of the silicate solution. The pine oil or other wetting and/or preservative agent and the rest of the water can be added at any time. The initial wetting of the protein with water is not essential, especially in the case of adhesives in which the ratio of Na$_2$O to SiO$_2$ is high and the ratio of Na$_2$O to protein is low. But this initial wetting assists greatly in obtaining a quick and uniform dispersion of the protein. All of the above adhesives were found capable of producing bonds with definitely improved water-resistance, as compared to those produced by either aqueous protein suspensions or ordinary sodium silicate adhesives.

In the tests using a commercial corrugating machine the machine was provided with the usual corrugating rolls between which a central ply was corrugated. While still carried by the large, internally heated corrugating roll the tips of the corrugations in the paper were coated automatically with the silicate-protein adhesive, applied by means of a transfer roll, after which the first liner was brought into contact and pressed against the freshly applied adhesive by means of the usual internally heated smooth roll. The single faced stock thus produced was then passed to the double backer where the exposed corrugated tips were coated with adhesive. The second liner was then applied to the coated tips and pressed by the double-backer hot plated in firm contact with the corrugations. Tests were run using hard-sized uncoated kraft sheets, hard-sized calender-coated kraft stock and also the regular jute and straw stocks. Speeds of about 200 feet per minute were employed. The total heat applied to cause setting of the adhesive was from about 50 to 200 per cent greater than that used for silicate adhesives at this speed.

In some of the above described runs the rosin sized stock was precoated by means of insolubilizing metal salts but the uncoated stock proved to be just as satisfactory in tests to determine desizing produced by the adhesive. This demonstrates that precoating by means of insolubilizing metal salts is not required when our silicate protein adhesives are employed. When test samples of the combined board produced as above were tested for the solubility of the adhesive bonds, it was found that the bonds were practically indefinitely resistant to water. The bonds of test pieces soaked in water for several days were not dissolved. This is a new result in the high-speed machine fabrication of fiberboard with inexpensive silicate adhesive.

During these tests it was found that our silicate protein adhesives possess another favorable characteristic. In fabricating machines, equipped with hot plates to produce an initial set, it invariably happens that some adhesive collects on these hot plates. Many adhesives form deposits on these plates which are troublesome to remove. But it was discovered that the silicate protein adhesives form porous deposits which are removed automatically by the weaving of the paper passing over the plates. These adhesives are thus ideally suited for use in high-speed pasting machines.

While we have described what we consider to be the best embodiment of our invention, it is evident that various changes may be made in the specific compositions and procedures described without departing from the purview of this invention. Thus, while we have described the invention solely in connection with sodium silicate solutions, it is evident that other alkali metal silicate solutions are applicable and can be substituted within the skill of the art. As mentioned previously, all vegetable protein materials and ground oil seed products are operative for the production of our adhesive provided that they contain at least about 10 per cent of protein. Any preservative which is compatible with the other ingredients can be added to our adhesives. Any other additions, such as wetting agents, waxes, sizes, fillers etc. can be made if desired. One advantageous additive is a finely divided, inorganic colloidal material, such as clay, iron oxide etc. This component may be used in proportions ranging up to about 12 per cent by weight but the quantity present should not substantially exceed the amount of the vegetable protein flour. In producing setting of the adhesive on the plies it is only necessary to heat the adhesive to a temperature of at least about 40° C. until setting is produced.

To summarize what we consider to be the broad and preferred ranges of the various components of our adhesives: the silicate, expressed in terms of commercial silicate solutions, should be within the broad range of from 2 to 55% by weight, while preferred ranges are from 2 to 30% and 40 to 55% by weight; the vegetable protein content has a broad range of from 2 to 10%, while the preferred range is from 3.5 to 10% by weight; the weight per cent ratio of $Na_2O$ to $SiO_2$ of the silicate has a broad range of from 1:2 to 1:4.0, while the preferred range is from 1:2.9 to 1:3.9; the broad range of starch content is from 0 to 20% by weight while the preferred range is from 3 to 15%; the clay content may vary from 0 to 12% by weight while the preferred compositions contain no clay; the initial viscosity may vary from about 0.3 to 6.0 poises while the preferred initial viscosity is from about 0.7 to 2.0 poises; on the anhydrous basis the silicate content may vary from about 26 to 0.6% while the preferred range is from about 24 to 0.6% by weight. In the specific examples the protein varies from 10% (Example 4) to 2.2% by weight (Example 8, Formula 5); the silicate varies from 54.2% (or 20.2% on the anhydrous basis) in Example 1 to 2% (or 0.6% anhydrous basis) in Example 4; the ratio of $Na_2O$ to $SiO_2$ varies from 1:3.22 (Example 1) to 1:3.9 (Example 2), the maximum starch content of 19.5% by weight is used in Example 2; the maximum clay content of 10.7% by weight is used in Example 7, Formula B; the total water content varies from 83.6% (Example 4) to 63.2% by weight (Example 7, Formula B), while the initial viscosity varies from 0.3 poise (Example 4) to 2.3 poises, in Example 7, Formula E and Example 9, first formula.

Further modifications of our invention which fall within the scope of the following claims will be immediately evident to those skilled in this art.

What we claim is:

1. A heat-setting liquid silicate-vegetable protein adhesive particularly suitable for the machine fabrication of paper board, which comprises a freshly made mixture of a vegetable protein material, selected from a class consisting of vegetable proteins and vegetable-protein carbohydrate flours containing at least about 10 per cent protein, in quantity sufficient to produce a vegetable protein content in the mixture within the range of from about 2 to 10 per cent by weight, with a commercial aqueous sodium silicate solution in the amount of from about 55 to 2 per cent by weight and with sufficient added water present during the mixing to produce a viscosity at operating temperatures of from about 0.3 to 6 poises; the ratio of the total alkali present, expressed as $Na_2O$, to the $SiO_2$ of the silicate solution being within the range of from about 1:2 to 1:4; said adhesive containing no more than about 20 per cent by weight of ungelatinized starch and being substantially free from any extraneous alkali in addition to that present in said silicate solution, having the characteristic property of increasing in viscosity upon heating even without substantial evaporation of water and having a working life of from about 15 minutes, in the case of adhesives substantially free from starch, to about a week, in the case of adhesives containing starch in quantities up to 20 per cent by weight.

2. The adhesive of claim 1 wherein the silicate content is within the range of from about 55 to 40 per cent by weight.

3. The adhesive of claim 1 wherein the vegetable protein content is within the range of from about 3.5 to 10 per cent by weight.

4. The adhesive of claim 1 wherein the ratio of $Na_2O$ to $SiO_2$ is within the range of from 1:2.9 to 1:3.9.

5. The adhesive of claim 1 wherein clay is present in the mixture in quantity ranging from about 2 to 12 per cent by weight and not substantially exceeding the quantity of protein material present.

6. The adhesive of claim 1 wherein the vegetable protein material is a soya bean flour.

7. The adhesive of claim 1 wherein the vegetable protein material is peanut flour.

8. The adhesive of claim 1 wherein the vegetable protein material is cottonseed flour.

9. The adhesive of claim 1 containing a quantity of a finely-divided insoluble inorganic colloidal material in amount not substantially exceeding 12 per cent by weight and not substantially exceeding the quantity of protein material present.

10. The adhesive of claim 9 wherein said inorganic colloidal material is iron oxide.

11. The adhesive of claim 1 wherein there is present as a preservative a small amount of a preservative oil which is a distillation product of tar and selected from a class consisting of pine oil, pine tar oil and rosin oil.

12. The adhesive of claim 1 wherein there is present as a preservative a small amount of tar acid oil.

13. The adhesive of claim 1 wherein the vegetable protein material in the mixture contains less than about 15 per cent of starch and wherein ungelatinized starch is present in the mixture as such in amount ranging from about 3 to 20 per cent by weight.

14. In the manufacture of liquid silicate-vegetable protein adhesives particularly suitable for the machine fabrication of paper board, the process which comprises mixing a vegetable protein material, selected from a class consisting of vegetable proteins and vegetable protein-carbohydrate flours containing at least about 10 per cent protein, in quantity sufficient to produce a vegetable protein content in the mixture within the range of from about 2 to 10 per cent by weight, with a commercial aqueous sodium silicate solution in amount varying correspondingly from about 55 to 2 per cent by weight and with sufficient added water present during the mixing to produce a viscosity at working temperatures of from about 0.3 to 6 poises, the ratio of the total alkali present, expressed as $Na_2O$ to the $SiO_2$ of the silicate solution being within the range of from about 1:2 to 1:4; no substantial amount of extraneous alkali being added to the mixture in addition to that present in the silicate solution; the resulting adhesive mixture containing no more than about 20 per cent of ungelatinized starch and having the characteristic property of increasing in viscosity upon heating and having a working life of from about 15 minutes, in the case of adhesives substantially free from starch, to a week, in the case of adhesives containing starch in quantities up to 20 per cent by weight.

15. The process of claim 14 wherein said protein material is dispersed in the added water before being mixed with the silicate solution.

16. The process of claim 14 wherein sufficient vegetable protein material is added to produce a protein content in the mix of from about 3.5 to 10 per cent by weight.

17. The process of claim 14 wherein the vegetable protein material added is a soya bean flour.

18. The process of claim 14 wherein the vegetable protein material employed contains less than 15 per cent starch and starch is added to the mixture as such in amount making a total ungelatinized starch content ranging from about 3 to 20 per cent by weight.

19. A liquid silicate-vegetable protein adhesive suitable for use in the machine fabrication of paper board, which comprises a freshly made mixture of a vegetable protein material, selected from a class consisting of vegetable proteins and vegetable protein-carbohydrate flours containing at least about 10 per cent protein, in quantity sufficient to produce a vegetable protein content in the mixture within the range of from about 3.5 to 10 per cent by weight, with a commercial aqueous sodium silicate solution in amount varying correspondingly within the range of from about 30 to 2 per cent by weight and with sufficient added water present during the mixing to produce a viscosity at working temperatures of from about 0.7 to 6 poises, the ratio of the total alkali present, expressed as $Na_2O$ to the $SiO_2$ of the silicate solution being within the range of from about 1:2.9 to 1:4; said adhesive being free from starch added as such, being substantially free from any extraneous alkali in addition to that present in said silicate solution, having the characteristic property of increasing in viscosity upon heating or standing at room temperatures and having a working life of from about 15 minutes to 8–12 hours.

20. In the manufacture of liquid silicate-vegetable protein adhesives suitable for use in the machine fabrication of paper board, the process which comprises mixing a vegetable protein material, selected from a class consisting of vegetable proteins and vegetable protein-carbohydrate flours containing at least about 10 per cent protein, in quantity sufficient to produce a vegetable protein content in the mixture within the range of from about 3.5 to 10 per cent by weight, with a commercial aqueous sodium silicate solution in amount varying correspondingly within the range of from about 30 to 2 per cent by weight and with sufficient added water present during the said mixing to produce a viscosity at working temperatures of from about 0.7 to 6 poises, the ratio of the total alkali present, expressed as $Na_2O$ to the $SiO_2$ of the silicate solution being within the range of from about 1:2.9 to 1:4; said adhesive being free from starch added as such, being substantially free from extraneous alkali in addition to that present in said silicate solution, having the characteristic property of increasing in viscosity upon heating or standing at room temperatures and having a working life of from about 15 minutes to 8–12 hours.

References Cited in the file of this patent

UNITED STATES PATENTS

| Number | Name | Date |
|---|---|---|
| 1,466,241 | Naemura | Aug. 28, 1923 |
| 1,757,805 | Laucks | May 6, 1930 |
| 1,851,952 | Dike | Mar. 29, 1932 |
| 1,950,060 | Osgood | Mar. 6, 1934 |
| 2,044,466 | Cleveland | June 16, 1936 |
| 2,102,937 | Bauer | Dec. 21, 1937 |
| 2,182,425 | Cone | Dec. 5, 1939 |
| 2,261,784 | Thompson | Nov. 4, 1941 |
| 2,457,108 | Baker et al. | Dec. 28, 1948 |

Certificate of Correction

Patent No. 2,681,290 June 15, 1954

Chester L. Baker et al.

It is hereby certified that error appears in the printed specification of the above numbered patent requiring correction as follows:

Column 3, line 18, after "enable" insert $a$; column 8, line 33, for "adhesive" read *adhesives*; line 55, for "CiO₂" read *SiO₂*; column 11, line 47, for "relatively" read *relative*; line 53, for "13 lbs." read *3 lbs.*; column 13, line 7, for "1Na₂" read *1Na₂O*; lines 33 and 34, for "Twing-Albert" read *Thwing-Albert*; column 15, line 67, for "where as" read *whereas*; column 17, line 47, for "embodiment" read *embodiments*;

and that the said Letters Patent should be read as corrected above.

Signed and sealed this 3rd day of August, A. D. 1954.

[SEAL]

ARTHUR W. CROCKER,
*Assistant Commissioner of Patents.*